United States Patent Office 3,697,302
Patented Oct. 10, 1972

3,697,302
DRUM-PHOTOSENSITIVE MEMBER AND METHOD
FOR MANUFACTURING THEREOF
Takashi Ihara, Kawasaki-shi, Takehiko Matsuo, Tokyo,
and Katsunobu Ohhara, Kawasaki-shi, Japan, assignors
to Canon Kabushiki Kaisha, Tokyo, Japan
Filed Sept. 2, 1969, Ser. No. 854,714
Claims priority, application Japan, Sept. 6, 1968,
43/64,205
Int. Cl. B05c 11/04; B44d 1/02; G03c 1/74
U.S. Cl. 117—34
13 Claims

ABSTRACT OF THE DISCLOSURE

A photosensitive member having a smooth and uniform surface provided by coating photosensitive material on a drum in uniform thickness. The principal novel method comprises rotating a cylinder on its horizontal axis, placing a knife edge of a blade along a cylinder generating line outside of the cylinder surface, maintaining a predetermined gap between the knife edge and the cylinder surface, facing the knife edge to the surface, supplying a wet photosensitive material to the V-shaped section formed by the upper surface of the blade and the cylinder surface, thereby coating the cylinder surface through said gap and then tilting the blade to bring the knife edge to a higher position than the opposite edge of the blade so as to cause excessive wet photosensitive material to flow from the drum over the surface of the blade to leave a uniform coating of photosensitive material on the drum.

---

This invention relates to drum photosensitive members for electrophotography and methods for manufacturing the same and more particularly to methods for applying a photoconductive coating to a drum photosensitive member for electrophotography.

The conventional photosensitive members for electrophotography are generally available in sheet form, for example, they comprise paper, metal foil, or metal plates coated with photosensitive material to a required thickness. In the case of the paper base, the photosensitive member can be used only once and its use is economically disadvantageous. The photosensitive member having a transparent, insulating outer layer has a speed deficiency because its image forming process is a batch operation, although the photosensitive member can be used repeatedly by reason of its character. To compensate for these deficiencies, some consideration has been given to use of a rotatable drum photosensitive member formed by winding a sheet form photosensitive member around a drum. But this system produces an abnormal image at the seam of the wound photosensitive member which introduces difficulty in erasing the image. In order to produce a good image on the photosensitive member, by avoiding the seam to prevent the formation of an abnormal image, the image forming equipment is synchronized with the chain of operations involving the original—photosensitive member—transcription paper at great design inconvenience.

If the photosensitive member is formed on a drum-shaped base without a seam, the image can be formed at any position on the photosensitive member. Then the need for complex equipmental synchronization can be completely avoided and, by the repeated use of the same photosensitive member, a large quantity of copies can be obtained rapidly and inexpensively. To meet this purpose there have been offered many methods for coating photosensitive material on a drum-shaped base to a constant thickness. For example, roll coating, kiss coating, screen coating, and paste coating are known methods of coating. However, none of these coating methods has brought full satisfaction since the specific gravity and diameter of fine photoconductive powders of photosensitive material for electrophotography are mostly large compared with those of usual pigments for paints, so that they are easily separated from solvents. This makes it difficult to keep them in the state of paint as required in the roll coating method and kiss coating method. Even if the coating were completed, the excessive photosensitive material present on the drum base would cause such phenomena as sagging and unevenness of photosensitive layer thickness. In the screen coating method, unevenness of the photosensitive layer also results, caused by the overlapping of photosensitive material at the initial portion of coating and the final portion.

An object of the present invention is to offer a novel method which provides a photosensitive member having a smooth and homogeneous surface by making the coating layer uniform and removing the unevenness in the thickness of the layer of photosensitive material due to sagging and like deficiencies.

Another object of the present invention is to obtain a homogeneous drum photosensitive member for electrophotography having a smooth surface provided by employing a homogeneous and smooth photosensitive layer.

A further object of the invention is to offer a method for producing the aforementioned photosensitive member quite easily.

A still further object of the invention is to offer a method for producing a photosensitive member comprising a drum and a photoconductive layer coated on the inner surface of the drum.

The above and other advantages of the invention will be more apparent from the following description referring to the drawing, in which.

Figure 1:
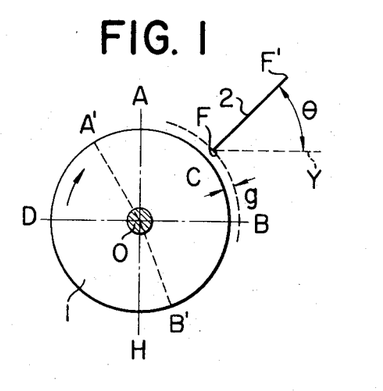
FIGS. 1 through 6 show the fundamental principle using a single flat blade.

In the drawing, 1 is a drum-shaped base obtained by finishing, for example, an aluminum cylinder to an out of roundness of $\frac{1}{100}$ mm.; 2 is a flat blade placed near the outer surface of a drum-shaped conductor at a distance of g. It is set at a position such that the straight line portion F of the edge becomes parallel to the generating line of the drum-shaped base at position C when the drum-shaped base 1 rotates in the direction as specified in FIG. 1. The position C is not a point fixed on the drum-shaped base 1, but a position corresponding to a portion of the drum specified within the system of coating equipment. Let $\overline{BD}$ be a horizontal secant passing through the center O of the rotation and $\overline{AH}$ be perpendicular to $\overline{BD}$, then a good result can be obtained when the position C is within the range of arc AB that runs along the surface of the cylinder. The position A can be shifted as far as the position A' is in the direction reverse to that of rotation as long as the photosensitive material poured at position C does not flow from position A toward position D.

The position A' is determined depending on the physical state of the photosensitive material, the speed of revolution of the drum-shaped base, and the surface state of the said base.

The position B can also be shifted as far as the position B' in the direction of rotation as long as the blade 2 can hold the angle $\theta$ at which the photosensitive material poured in position C does not flow out of the other end F' of the blade along the surface of the blade 2.

The speed of revolution of the drum-shaped base must be greater than the speed at which the photosensitive material produces sagging due to its own weight and at the same time must be small enough for the photosensitive material not to be scattered by the centrifugal force.

For example, a revolutional speed of 10 to 100 r.p.m. is desirable for a drum-shaped base having a diameter of 150 mm.

Figure 18:
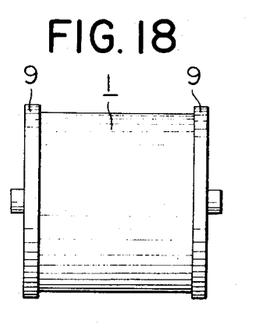
FIG. 18 is a front view of a drum-shaped base having a step on each end for controlling the thickness of the photosensitive layer.
Figure 19:
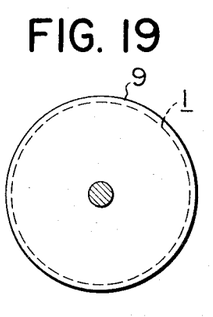
FIG. 19 is a side view thereof.

The distance $g$ between the straight portion F of the edge of the blade and the position C is determined depending on the composition etc. of the photosensitive material. However, it is desirable to be 1.5 to 2.5 times as long as $k$, which is the required thickness of the photosensitive layer after solidification. To establish the distance $g$, place a disk 9 having a diameter larger than that of the drum-shaped base by $g$ on each circular side of the drum-shaped base 1 concentric with the drum-shaped base, as shown in FIGS. 18 and 19, and apply edge F of blade 2 to the circumference of the disk 9 so that it goes along the generation line. Another method is to provide a belt or ribbon having a thickness of $g$ on both sides of the cylindrical surface of the drum-shaped base.

Figure 2:
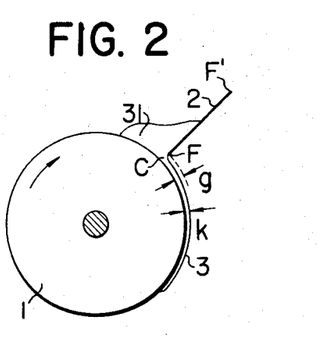
Figure 3:
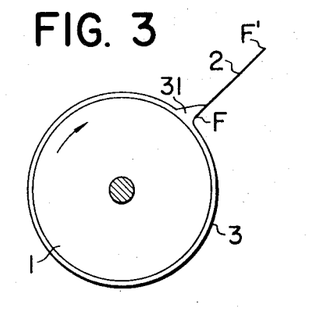

When coating, rotate the drum-shaped base 1 in the direction of the arrow and apply the straight portion F of the edge of blade 2 to position C on the drum-shaped base along the generating line of the cylinder, maintaining a gap $g$. The blade 2 is so placed that the blade knife edge section F is lower in position than the opposite edge F', making an angle $\theta$ with horizontal surface. Then pour the photosensitive material 31 on to the surface of the cylinder in an amount sufficient to cover the whole surface of the cylinder to a thickness of $k$, which is smaller in value than $g$, and is the actual thickness of the photosensitive material covering the drum-shaped body 1. This thickness is obtained by surface tension, adhesion force, etc. of the photosensitive material 31, which once possessed a thickness of $\overline{CF}$ ($=g$) due to its adhesion to F when it passed through the gap $\overline{CF}$ as shown in FIG. 2. The photosensitive material 31 that has passed through the gap $\overline{CF}$ is evenly coated to a thickness of $k$ along the cylindrical surface as shown in FIG. 2 and, when the cylinder has made one or more turns, the cylinder surface is covered with an unsolidified photosensitive layer 3 having a thickness of $k$ as shown in FIG. 3. However, excessive photosensitive material 32 remains at the V shaped section formed by the blade 2 and the cylinder surface. Therefore, if the blade 2 is removed from the position C in this state, the excessive photosensitive material 32 will remain on the unsolidified photosensitive material layer 3 and make a part thereof and causes sagging and unevenness in the thickness of the photosensitive layer.

Figure 4:
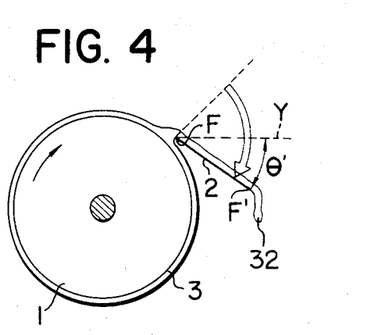
Figure 5:
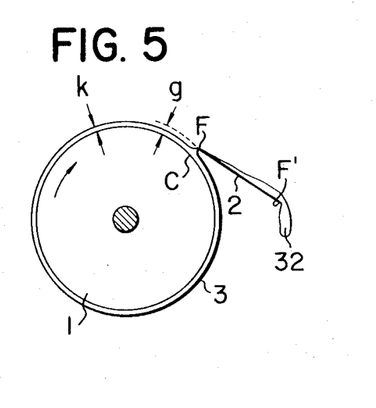
Figure 6:
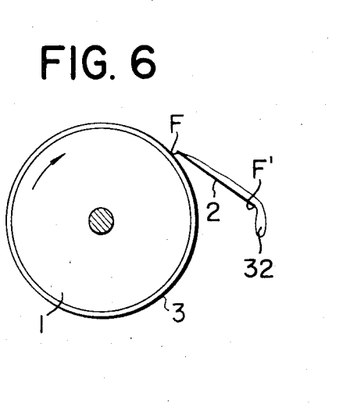
Figure 8:
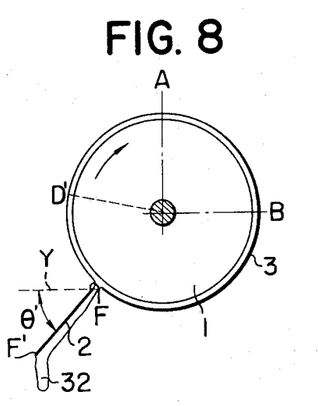

Therefore, as shown in FIG. 4, the blade 2 is moved in the direction of arrow so that its edge F is positioned higher than the opposite edge or end F'. In other words, the end F' is now disposed below the horizontal plane Y, with an angle $\theta'$ between it and the horizontal plane. By this operation the excessive photosensitive material 32 flows down from F to F' along the surface of the blade 2, and is removed from the drum surface. With the gradual decrease in the amount of excessive photosensitive material 32 present between C and F, since the gap $g$ between C and F is greater than the thickness $k$ of the photosensitive material layer at positions other than the position C, the photosensitive material will make a slight contact with F at position C due to its viscosity, surface tension, and adhesion force to the blade 2 and, when the rotation of the drum-shaped base is further continued, the edge F of the blade 2 leaves the coated photosensitive material layer 3, and a homogeneous drum-shaped coated layer is provided having no coating unevenness, such as sagging and striped pattern on the surface of the photosensitive material layer 3. In the described case, the distance $g$ or CF between the blade 2 and the position C was unchanged when removing the excessive photosensitive material and the physical behavior of the photosensitive material caused by the rotation of the drum-shaped base was utilized. It is extremely effective, when desired to accelerate the coating operation or to make the coated layer 3 extremely thin, that is when th gap $g$ between C and F is small, to pull the edge F of the blade 2 away from the surface of the photosensitive material 3 by moving the edge F gradually as the excessive photosensitive material 32 between C and F is almost depleted. The position of the blade 2 in the case of removing the excessive photosensitive material 32 can be different from the position C for the time of coating and can be set at any position along the arc ABD' on the circumference of the drum within the range in which the blade can attain an angle $\theta'$ with the horizontal plane which is sufficient for the excessive photosensitive material 32 to flow down from F toward F' on the surface of the blade 2. When the position for the removal of the excessive photosensitive material 32 and the coating position C are taken on the same arc BH of the drum circumference, the excessive photosensitive material 32 flows along the upper surface of the blade 2. In this case, flow of the excessive photosensitive material is sometimes difficult at the initial stage of removal depending on the composition of the photosensitive material from reasons of physical relationship between it and the blade 2. So far as this matter is concerned, it is better to place the blade 2 on the position on the arc HD where the excessive photosensitive material will flow along the lower surface of the blade 2 as shown in FIG. 8. The case in which the photosensitive material flows on the lower surface of the blade 2 is advantageous when the sedimentation of the pigment contained in the photosensitive material is rapid because the photosensitive material flows on the liquid surface of a blade that has previously been wetted. However, this operation lacks in efficiency. The angle made by the blade 2 against the drum-shaped base is determined depending on the physical characteristic of the photosensitive material, speed of revolution of the drum etc. However, it is not advisable to fix the blade in the direction of a tangent line of the drum-shaped base even when the angles between the blade and the horizontal plane at time of coating the photosensitive material and removing the excessive photosensitive material and the position of the blade on the circumference of the drum-shaped base are within the above-stated ranges.

The aforementioned explanation is concerned with the method in which the photosensitive material is poured i.e., when coating the photosensitive material from the V-shaped section formed by the drum-shaped base 1 and the blade 2 and causing the excessive photosensitive material to flow down on the surface of the blade 2, to be expelled to the outside of the system of the coating equipment at time of removing the excessive photosensitive material, by changing the angle between the blade 2 and horizontal plane. This method requires as a technical consideration that the photosensitive material, when it is poured onto the drum-shaped base, be poured onto the whole surface simultaneously along the generating line of the drum-shaped base. Moreover, there may be a chance for this method to stain nearby places because the excessive photosensitive material is made to run down on the blade at time of removal.

Figure 9:
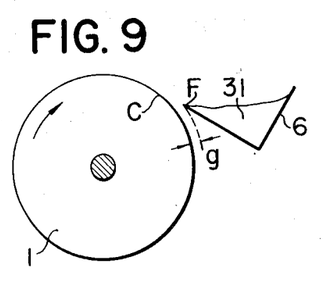
FIGS. 9 through 11 show modifications wherein the flat blade is replaced with a vessel type blade.
Figure 10:
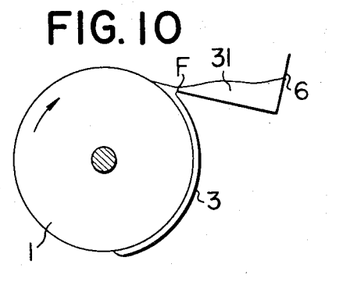
Figure 11:
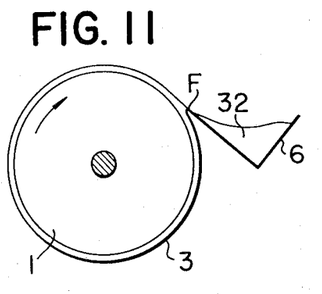

It is therefore effective to use a vessel type blade shown in FIGS. 9 through 11 to overcome these problems. First, a vessel type blade 6 is provided as shown in FIG. 9 and the inside vessel portion is filled with photosensitive material 31. The vessel type blade is a groove like vessel and one side of the upper end of the vessel wall forms a straight line longer than the generating line of the drum-shaped base. This part has a cutting edge F. Although in FIG. 9 a vessel portion having an L-shaped cross section is shown, the shape can be semi-circular or any other form. The edge of the vessel type blade 6 is placed along the generating line of the drum-shaped base 1 to have a gap g therebetween and, while rotating the drum-shaped base 1, the vessel type blade 6 is rotated gradually around the edge F so that the photosensitive material 31 will flow into the gap CF. The photosensitive material passes through the gap g between C and F and is coated on the drum-shaped base as shown in FIG. 10. If the drum-shaped base is rotated further the photosensitive material is coated on the whole cylinder surface of the base. If the vessel-type blade 6 is rotated around its edge at this point as shown in FIG. 11, the photosensitive material 31 contained in the vessel-type blade will be separated from the coated material 3 by the edge F of the vessel-type blade 6, the photosensitive material 3 will be coated on the drum-shaped base evenly and the excessive photosensitive material 32 will be returned into the vessel-type blade 6. The excessive photosensitive material that has returned to the vessel can be used as the photosensitive material 31 in the following coating operation.

The method explained by referring to FIGS. 9 through 11 is the one in which angle between the vessel-type blade 6 and the horizontal plane is changed. By employing the method shown in FIGS. 12 and 13, a good coating can be exercised without changing the angle of the vessel-type blade 6. A supply plate (simply called a weir plate hereinafter) 7 is provided in the vessel-type blade 6 of FIG. 12, placed at the position shown in FIG. 12, and then the photosensitive material 31 is poured into the V shaped section formed by the weir plate 7 and the edge F, is made to overflow uniformly at the edge F, and coated uniformly on the cylinder surface of the rotating drum-shaped base through the gap g. When the weir plate 7 is removed as shown in FIG. 13, the excessive material 32 is returned to the inside of the vessel-type blade 6, and is separated from the photosensitive layer as was described previously and a uniform photosensitive material layer 3 is provided on the drum-shaped body.

Figure 12:
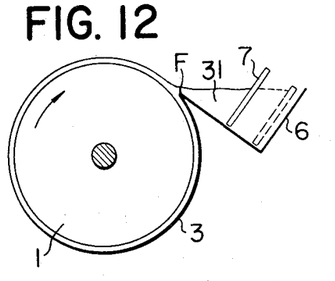
FIGS. 12 and 13 show an example using a blade having a weir for coating photosensitive material.
Figure 13:
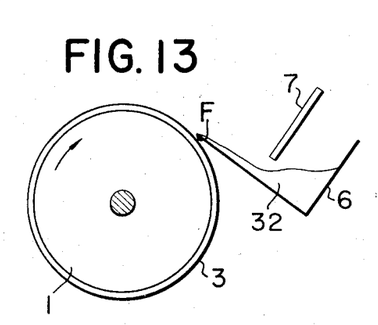

Another method is to make the weir plate 7 contact with the back wall within the vessel type blade as shown in FIG. 12, to fill the vessel-type blade 6 with photosensitive material 31 and then to move the weir plate 7 gradually toward the edge F along the bottom of the vessel-type blade 6, to let the photosensitive material 31 overflow at the edge F to make a uniform coat on the rotating drum-shaped base, and then to return the weir plate 7 gradually to the original position or to remove the weir plate 7 from the vessel-type blade 6 as shown in FIG. 13 in order to return the excessive photosensitive material 32 to the inside of the vessel-type blade 6 for purpose of obtaining the drum-shaped photosensitive material coat layer 3. The excessive photosensitive material that has returned to the vessel-type blade 6 is used as the photosensitive material 31 for the next coating operation.

According to the method shown in FIGS. 12 and 13, and the coating operation can be carried out with the vessel-type blade fixed. This brings stability in operation, reduces the loss of photosensitive material, and results in an excellent coating having a smaller chance of staining nearby objects.

Since the methods employing a vessel-type blade as shown in FIGS. 9 through 13 make use of the overflow of the photosensitive material 31 at the edge F of the vessel-type blade 6 at time of coating and of the flowdown of the excessive photosensitive material from the edge F of the vessel-type blade 6 into the vessel-type blade 6 at time of removing the excessive photosensitive material, the shape of the vessel-type blade 6 and its position and angle with respect to the circumference surface of the drum-shaped base are so determined to enable the photosensitive material to overflow or to flow down. As for the shape of the vessel-type blade 6, it is desirable to be as such that the photosensitive material is allowed to move smoothly between the edge F and the vessel section, that the vessel does not allow the photosensitive material to overflow from sections other than the edge F, that it is positioned along the arc ABH on the circumference of the drum-shaped base when the drum-shaped base is assumed to rotate in the direction of arrow shown in FIG. 1. Moreover, it is also desirable for the angle between it and the horizontal plane to be such that no overflow is made except for the edge F of the vessel-type blade 6 at time of coating, and the excessive photosensitive material runs down only from the edge F of the vessel-type blade 6 into the vessel at time of removing the excessive photosensitive material without overflow from any sections thereof.

Figure 14:
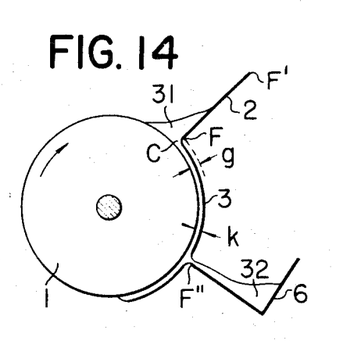
FIGS. 14 and 15 show an example using one blade exclusively for coating photosensitive material and a separate blade exclusively for removing the photosensitive material.
Figure 15:
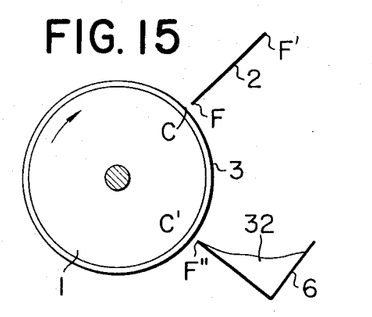

The explanation mentioned so far is concerned with an example that uses a single flat blade 2 or vessel-type blade 6. Good results can also be obtained by using two separate blades, one blade 2 for coating photosensitive material and the other blade 6 for removing excessive photosensitive material as shown in FIGS. 14 and 15. Here the blade for removing excessive material is not necessarily a vessel-type blade but a flat blade as shown in FIGS. 4 through 8 can also meet the requirement. It is also possible to use a vessel-type blade in place of the flat blade 2 for coating. In FIG. 14, the photosensitive material coating blade 2 is positioned in such a way as to hold a gap g between its blade F and the drum-shaped base. On the other hand, the vessel-type blade 6 used exclusively for removing the excessive photosensitive material is placed in such a way as to hold a gap k between its edge F" and the drum-shaped base. Set the rotating direction of the drum-shaped base as that indicated by the arrow in FIG. 14 and apply the photosensitive material to the blade 2. Then the surface of the drum-shaped body will be covered with the coating photosensitive material layer 3 to a thickness of k, and the layer will touch the edge F" of vessel-type blade 6 used exclusively for removing the excessive photosensitive material. When the photosensitive material 3 touches the edge F", move the vessel-type blade 6 slightly to increase the gap between C' and F" from k to g. Then the photosensitive material will gradually flow down along the surface of the vessel type blade 6 from F" into the vessel with the rotation of the drum-shaped base and accumulate in the vessel as the excessive photosensitive material 32.

On the other hand, the amount of excessive photosensitive material at the edge F of the coating blade 2 will be reduced with the increase in the amount of excessive photosensitive material in the vessel-type blade 6 until material 31 is depleted. Then the edge F will lose contact with the coated photosensitive material layer 3. Good results may be obtained by moving the blade 2, when there remains almost no excessive photosensitive material on the edge F of the blade 2, to separate the edge F from the photosensitive material for electrophotography on the cylinder surface of the drum-shaped base. The flow-down of the excessive photosensitive material from F" into the vessel-type blade is also diminished gradually and finally the contact between the edge F" and the coated photosensitive material layer 3 is cut off and a uniformly coated layer will be formed on the drum-shaped body.

Figure 7:
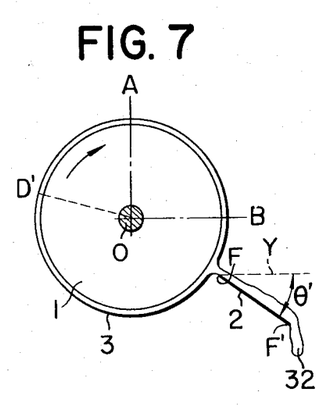
FIGS. 7 and 8 show the aforementioned blade as it is moved around the drum-shaped base.

As was described foregoing, different from the system using one flat blade, the system employing two separate blades, one for coating and the other removing, requires no change in the angles between the blades and horizontal plane and no movement of the blades along the cylinder surface of the drum base. Therefore, it is advantageous in that coating equipment with simpler mechanism can be obtained. When employing two blades, the edge of the blade used exclusively for coating should not be made sharp but be more or less round to improve the flow of the photosensitive material between the said edge and the surface of the drum-shaped body and the edge of the blade used exclusively for removing excessive photosensitive material should be made sufficiently sharp to cut off the photosensitive material in order to obtain a good result. Even when two blades are employed it is naturally necessary for the blade used excessively for coating to hold an angle $\theta$ between it and horizontal plane if the said blade is flat, and when a vessel-type blade is used it is required to have such a construction as to allow the photosensitive material to overflow from its edge. Furthermore, when the blade used exclusively for removing the excessive photosensitive material is flat it must hold an angle $\theta'$ between it and horizontal plane as shown in FIGS. 4, 7, and 8 and, when the blade is a vessel-type one it must have a shape and form that allows the excessive photosensitive material to run down from its edge into the vessel.

The aforementioned methods for applying a coat of photosensitive material make use of the dynamic behavior between the motion of the drum-shaped body and photosensitive material and the dynamic and static behaviors of the photosensitive material as its physical character and the conditions for uniformly coating the same vary over a wide range and are determined depending on the dynamic and static characteristics in turn determined by the revolutional speed of the drum-shaped base, the size of the cylinder, its surface conditions, the viscosity, surface tension, viscoelasticity, the characteristics of the photoconductive fine powder, binding resin, and flow of the photosensitive material, and solvent, and the surface condition, shape, and position of the blades, etc.

Figure 16:
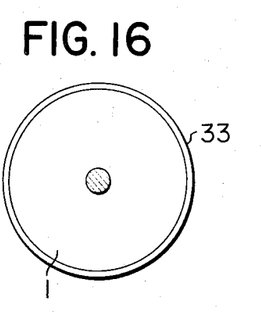
FIG. 16 is a side view showing a photosensitive layer having a specified thickness formed on a drum-shaped base.
Figure 17:
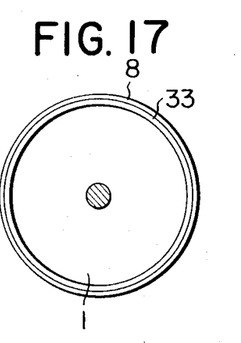
FIG. 17 is a side view showing a transparent electrically insulating layer provided on the surface of the said photosensitive layer.

FIG. 16 shows a solidified electrophotographic photosensitive material layer 33 (shown unsolidified, for example, at 3, FIG. 13) that has been coated uniformly on the surface of drum-shaped base 1 by employing the aforementioned methods. FIG. 17 shows a transparent electrically insulating layer 8 provided on the surface of the photosensitive material layer when required.

In coating photosensitive material on a rotating drum-shaped base an accuracy requirement of 1/200 mm. in the thickness of the photosensitive material layer sometimes exists. In such instance, the dynamic accuracy of the surface of the cylinder rotating on the coating equipment must be improved. What is most influential on the said accuracy is the center movement phenomenon often caused by the mismatching that exists between the rotation center of the cylinder of the machine tool which makes the drum-shaped base and that of the coating equipment. Such being the case, if the coating equipment is provided with a cylinder cutting and grinding device or if the cylinder cutting and grinding device is provided with a coating equipment, and the drum-shaped base is made first by cutting and grinding the surface of a cylinder to a required diameter and then coating is carried out without detaching the drum-shaped base from the equipment, an extremely accurate and uniformly coated layer can be obtained because there is no center movement. In other words, a highly accurate drum photosensitive member can be obtained by using the same rotation center at time of processing the cylinder and at time of coating photosensitive material on the same cylinder to remove center movement of the cylinder as a factor.

As mentioned above, this invention enables the photosensitive material that has been supplied to the surface of a drum-shaped conductor to be formed a layer having a uniform thickness by the action of a blade facing the said conductor, and of the excessive photosensitive material flowing down due to its own weight, the blade being placed slantwise and edge up. This makes it possible to finish a uniform photosensitive material layer coated on the surface of the drum-shaped conductor without sagging and stripes that may be otherwise caused by the excessive photosensitive material with an extremely simple configuration and without using any special equipment. Therefore this invention is very useful as the manufacturing method of a drum photosensitive member for electrophotography.

Figures 20, 21, 22, 23, 24:
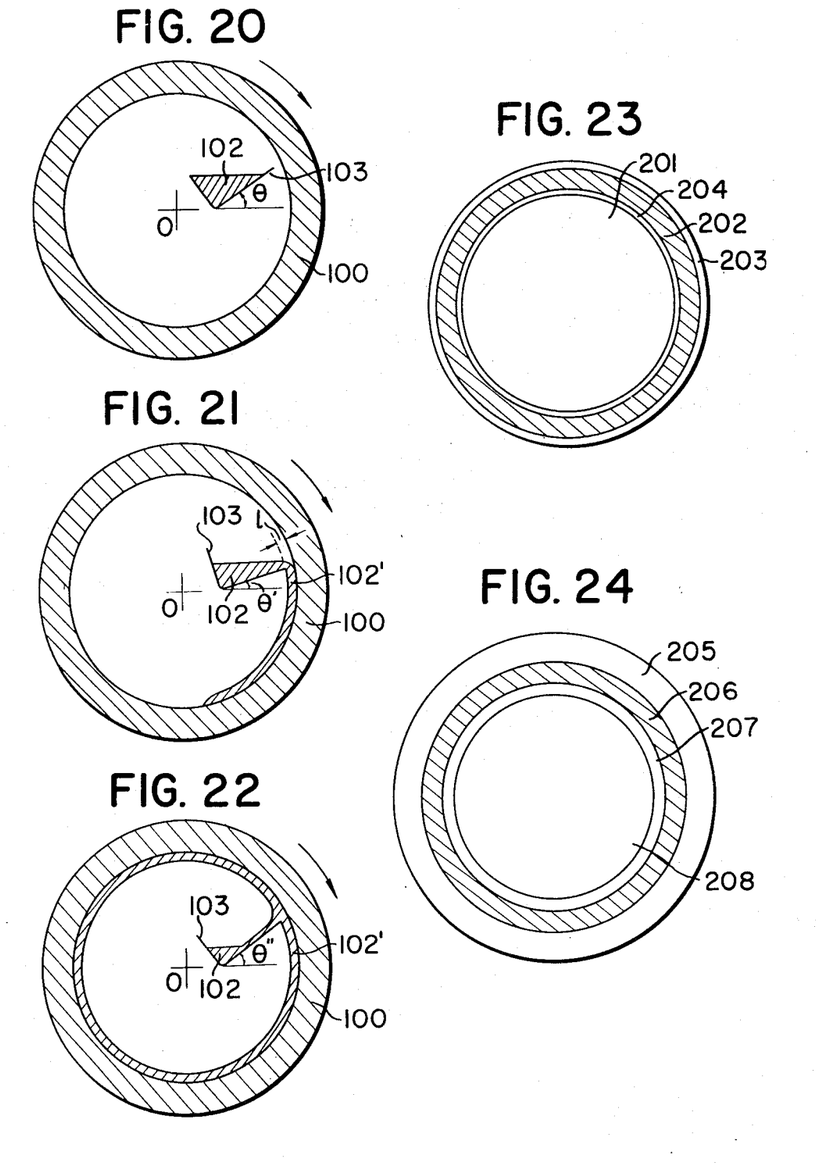
FIGS. 20 through 22 show a method for coating the aforementioned material on the inner surface of a hollow cylinder.
FIGS. 23 and 24 show the cross sectional view of a drum photosensitive member obtained by this invention.

Moreover, the coating method of this invention provides not only the method for coating the outer surface of the drum photosensitive member but also the method for coating the inner surface thereof. This case will be explained in the following. The method shown in FIGS. 20 through 22 is an embodiment of the present invention, in which 100 is a drum-shaped base having a hollow interior, the surface of the internal wall being completely polished for improving its smoothness and adhesive property. The photoconductive material is placed in the vessel-type blade and, due to the inclination of the said blade and due to its fluidity, is coated on the inside of the base 100. FIG. 20 shows a hollow cylinder 100 having a vessel-type blade 102 therewithin. The said cylinder 100 rotates around the central shaft O in the direction of the arrow and, by tilting the vessel-type blade 103 by an angle of $\theta$, coats the photoconductive material 102 contained in the said vessel-type blade 102 on the inner surface of the hollow cylinder 100. In this case, it is necessary to install the vessel-type blade 103 at a proper distance from the hollow cylinder 100 as shown in FIG. 21. The gap is important in that it determines the thickness of the photoconductive layer to be coated. Although it is possible to determine the thickness from the angle of inclination $\theta'$ of the vessel-type blade, the result is not desirable from reason of the quantity, fluidity etc. of the photoconductive material 102. To do this effectively, a method by which a specified quantity of photoconductive material is supplied by installing a freely movable weir plate in the vessel-type blade as shown in FIG. 12 is preferred. As shown in FIG. 21, after coating the photoconductive material by rotating the hollow cylinder, if there remains an excessive amount of photoconductive material it may remain on the bottom of the said cylinder 100 and form a protrusion. Therefore, in order to keep the surface of the photoconductive body smooth and uniform as shown in FIG. 22, the rotation of the cylinder 100 is continued further, and the vessel-type blade 103 is shifted to the position indicated by the angle of $\theta''$ to maintain the said gap and to scrape off the excessive photoconductive material. In this case although the angle $\theta''$ required for the vessel-type blade to shift can be selected arbitrarily, the angle must meet the requirements such as to be also able to accommodate the excessive photoconductive material without fail and to hold the specified gap. The angle of inclination of the vessel-type blade 103 can of course be changed to any value as long as the value stays within the range in which the photoconductive material does not overflow from the said container.

One example of the forms of coating photoconductive material on the inside of a hollow cylinder has been described. However, the method employing the coating method mentioned previously can also be carried out very effectively. For example, it is possible to install a supply blade and a blade for removing excessive material separately, and it is also possible to employ a flat blade instead of a vessel-type blade. Although the layer formation of the photosensitive member by either of the above-mentioned methods can be basically the same, it is determined by the quality of the material used to build the cylinder or hollow cylinder which is the main body of the member. In most cases, since these cylinders are made of conductive material such as metal they generally take the following configuration.

FIGS. 23 and 24 show respectively cross sectional constructions of photosensitive members obtained by this invention. The layer formation in the case in which the photoconductive material is coated on the outer surface of the cylinder takes, in most instances, the form in which the photosensitive material 202 is provided on a conductive base 201 and an insulating layer 203 is provided on the photosensitive material 202 as shown in FIG. 23. Although the base is electrically conductive, it is also possible to insert a thin insulating layer in the interface between the base and the photoconductive layer. The insulating layer need not be transparent. In the case where the coating is made on the inner surface of a hollow cylinder, the layer formation is such that conductive base 205 provides the outer drum surface, with the photoconductive layer 206 and insulating layer 207 within the order as shown in FIG. 24, and 208 shows the hollow interior. Such a formation is determined by the structure of the cylinder that forms the base. This is, although the cylinder or hollow cylinder itself may provide the base of the photosensitive member when coating is carried out by employing the invented method, since other substances, such as an insulating substance that has undergone conductive treatment or a conductive substance that has undergone insulative treatment can also be used, a wide variety of substances can be employed as the base.

An excellent photosensitive member can be obtained when each cylinder mentioned above has structural rigidity, a mirror-like smooth and mar-proof surface and closely contacts the photoconductive material layer. Metals are considered to be representative of the substances that satisfy these conditions. If, however, metal cylinders are used as cylinders described respectively above, the base itself is conductive and the drum photosensitive members have the layer formation mentioned above. If an insulating material satisfying the above-mentioned conditions is used, the formation can contain many layers.

Next, the names of actual substances that can be used in this invention will be mentioned below. As photoconductive fine powder, powdered inorganic photoconductive substances such as ZnO, CdS, CdSe having an average granular diameter of 0.1 to 30 m$\mu$ can be used and organic photoconductive substances such as 4-dimethyl-aminobenzylidine-2-methylbenzoic acid hydrazide, poly-3,6-dibrom-N-vinyl carbazole can also be used. By using such substances a photoconductive layer having excellent characteristics for the coating process and photosensitive material can be obtained since they are homogeneous and transparent. In other words since they belong to a homogeneous system, coating can be carried out easily and the result is stable in shape and in quality compared with a dispersion system. Moreover, since the photosensitive layer thus formed is transparent, the loss of radiant energy in the photosensitive layer is small and it is also possible to irradiate from behind the photosensitive layer.

The following resins can be used as the binder resins for binding these photoconductive fine powders: Silicone resin, copolymer of vinylacetate and vinylchloride, vinyl chloride resin, alkyd resin, urethane resin, epoxy resin, polyvinyl alcohol resin, formal resin, cellulose family resin, and other binding resins that are suitable for coating. Dried films of these resins are highly insulating. Although it is possible to melt the photoconductive material physically, for example by heating, in order to give fluidity to it, it is desirable to use a solvent which allows the photoconductive material to have any degree of fluidity. As examples of solvents, although any solvent suitable for use with the binding resin used can be successfully employed, ethyl alcohol is used when ethyl cellulose is used as the binding resin, and methyl ethyl ketone, toluene etc. are used when vinyl acetate resin is used as the binding resin. Besides, solvents belonging to aromatic family, aliphatic family, alcohol family, ketone family, water family, and ether family can be used selectively according to need. Mixtures of these solvents can also be employed.

The representative composition of these mixed type photosensitive solutions for electrophotography will be described below.

(1)

| | Parts by weight |
|---|---|
| Photoconductive lead oxide (Sazex No. 100 produced by Sakai Kagaku Co.) | 100 |
| Silicone varnish (KR–211 produced by Shinetsu Kagaku Co.) (as solid matter) | 30 |
| Xylene | 20 |

A mixture of these constituents is mixed and kneaded for about 10 hours in a ball mill.

(2)

| | Parts by weight |
|---|---|
| Photoconductive cadmium sulfide (activated with copper) | 100 |
| Copolymer varnish of vinyl chloride and vinyl acetate (Vinyl clear lacquer No. 1 produced by Morikawa Ink Co.) (as solid matter) | 10 |
| Diluting agent (VF–600 produced by Morikawa Ink Co.) | 3 |

A mixture of these constituents is placed in a homogenizer and dispersed uniformly for about 1 hour.

As for insulating layers, any substance that permeates radiation to which the photoconductive body is sensitive can be used. For example, polyethylene, polystyrene polyester, polycarbonate, polyvinyl chloride, triacetate cellulose, shellac, and alkyl resin can be used in film form. These insulating layers can be pasted on the photosensitive member (photoconductive layer) or, if they are thermo-contractible, softened by heating before pasting and then contracted to make a close contact. Besides, they can be used by coating. For instance, methylcellosolve acetate solution of cellulose triacetate and xylene solution of alkylphenol resin are used, for example, in the blade method similar to the invented method, in a spray method, or in an immersion method.

A photosensitive member which is not high in image contrast and uniform in charged state and suitable for copying a continuous tone object, for example, photograph, can be obtained by providing an insulating film between a conductive drum-shaped base and a photosensitive layer.

The insulating layer need not be light translucent and highly insulating substances 2 to 20 microns in thickness meet this purpose. For example, a thermo-contractible film (a kind of polyester or vinylchloride films) provided in close contact with a drum base by heating or insulating painting (for example, alkyd resin painting) applied on the surface of the drum meets this purpose. The photosensitive layer for electrophotography is formed on the surface of the film thus formed. The insulating film in this case should not be damaged by the photosensitive solution painted on it. Moreover, this film must stay between two phases, the drum-shaped base and photosensitive layer for electrophotography, uniformly and in close contact and further in a state strong enough but not too strong to hinder practical use. As for powdered paint, such powders as vinylchloride resin powder, epoxy resin powder (with joint use of a hardner) can be applied in powder painting method. In the case of liquid paint, it is necessary, depending on the paint used, to select a proper solvent which does not damage the photosensitive layer.

As for the base body, although explanation was given previously, besides metals that are in general use, a base having desired properties and satisfying the aforementioned conditions can be obtained by joint use of various materials which are conductive or insulating. For example, such insulating materials include plastics, glass, paper, wood, ceramics, etc. and such conductivity donors in conducting painting and plating as paint containing silver or silver oxide, paints containing Al plating and carbon black. These are combined by means of spraying, immersion, or brush painting to produce a conductive drum. Further explanation will be made referring to the following examples.

EXAMPLE 1

To 100 parts by weight of photoconductive zinc oxide (Sazex 1000 produced by Sakai Kagak Co.) was added 30 parts by dry weight of silicon varnish (KR-211 produced by Shinetsu Kagaku Co.) followed by 20 parts by weight of xylene. The mixture was kneaded in a ball mill for 10 hours to obtain a photosensitive material for electrophotography. As the drum-shaped base was used an aluminum cylinder, 150 mm. in diameter and 260 mm. in length, which was ground to an out of roundness of 1/100 mm. The axis of rotation of the drum-shaped base was held horizontal, and the speed of revolution was 50 r.p.m. Steel ribbon, 0.05 mm. in thickness and 10 mm. in width, was applied to both ends of the cylinder by means of interlocking tape to make the total thickness of 0.07 mm. This thickness was used as the wetting thickness of the photosensitive material.

A blade having a 300 mm. long edge was installed along the generating line of the cylinder in such a manner that the edge contacted the ribbon on each end of the drum-shaped base. The blade was placed to make an angle of 45° with horizontal plane and the knife edge of the blade was placed lower than the other end. The aforementioned photosensitive material was poured into the V-shaped section formed by the rotary cylinder and the edge and the cylinder was rotated 3 turns. The photosensitive material was coated on the cylinder surface of the cylinder uniformly. At this point, there was present an excessive amount of photoconductive material in the V-shaped section formed by the blade and the rotary cylinder. Then, the blade was rotated in the same direction as the cylinder to gradually decrease the angle between the blade and horizontal plane and, further, the edge of the knife edge of the blade was made to occupy a position higher than the other end so that the angle formed by the blade and horizontal plane was about 30°. In this state, the excessive photosensitive material flowed down along the blade from said other end, and thus the excessive photosensitive material on the drum-shaped base was removed. The photosensitive material that connected the knife edge of the blade to the coated surface was broken off soon and a uniform coat of photosensitive material on the cylinder surface was provided. With the cylinder rotating, the photosensitive material on the drum-shaped base was dried and solidified by warm wind of about 60° C. The drum was then placed in an air dryer for 2 hours at 70° C. to complete the solidification, and thus a drum potosensitive member for electrophotography was completed. The drum photosensitive member for electrophotography was then left to cool to room temperature, assembled in the electrophotographic image forming equipment, negatively charged on the surface of the photosensitive member by corona discharge of 7 kv., followed by optical image irradiation and powder development, and an image was provided. This powder image was pressure transferred to a good quality paper while grounding the paper, fixed by heating, and thus a good quality copied image was obtained. The developing powder remaining on the drum photosensitive member in some quantity was wiped off a cloth and the drum photosensitive member entered a further image forming operation.

EXAMPLE 2

To 100 parts by weight of photoconductive cadmium sulfide (activated by copper) were added 10 parts by dry weight of copolymer varnish of vinyl chloride and vinyl acetate (Vinyl clear lacquer No. 1 produced by Morikawa Ink Co.) and 2 parts by weight of diluting agent (VF-600 produced by Morikawa Ink Co.). The mixture was dispersed uniformly in an agitator and a photosensitive material for electrophotography was obtained. As the drum-shaped base, an aluminum cylinder having an out of roundness of 1/100 mm. and an axis of rotation, 145 mm. in diameter and 260 mm. in length, on both sides of which were fitted respectively aluminum disks, as shown in FIG. 18, 145.6 mm. in diameter and 10 mm. in thickness to make a gap between the drum-shaped base and the blade and to control the thickness of the photosensitive material layer. The wetting thickness of the drum-shaped base was 0.3 mm. The drum-shaped base was assembled into the coating equipment and the blade for exclusive use in coating was placed, as shown in FIG. 14, along the generating line of the cylinder in such a way that the edge of the blade contacted the photosensitive-material-thickness-controlling disks on both ends of the cylinder. The knife edge of the blade was placed lower than the other end and the angle between the blade and horizontal plane was 45°. The vessel-type blade for exclusive use in removing the excessive photosensitive material was so placed that the knife edge of the blade comes to the cylinder side and that the excessive photosensitive material flows down from its edge into the vessel. The straight portion of the knife edge run along the generating line of the cylinder. The edge of the blade for exclusive use for coating was slightly rounded make the flowing-in of the photosensitive material easier, and the edge of the vessel-type blade for exclusive use for removing excessive photosensitive material was sharpened. The vessel-type blade was so made that both end portions thereof were recessed by 0.01 mm. and that the gap between the drum-shaped base and the edge was 0.02 mm. when the recessed portions of the vessel-type blade contacted the photosensitive material thickness control disks. First, the recessed portions of blade 2 for exclusive use in coating and the blade for exclusive use in removing excessive photosensitive material were placed in contact with the photosensitive material layer thickness controlling discs as shown in FIG. 14, and the aforementioned prepared photosensitive material was poured into the V-shaped section formed by the blade for exclusive use in coating the drum-shaped base. The coated photosensitive material layer on the surface of the drum-shaped base touched the edge of the vessel-type blade uniformly and the excessive photosensitive material started to flow down on the surface of the said vessel-type blade from its edge into the vessel and then the photosensitive material at the photosensitive material feeding section the vessel-type blade was separated from the drum-shaped base by a gap of 0.3 mm. between the generating line of cylinder and the knife edge of the vessel-type blade while the rotation of the cylinder was continued. In a short time, the connection between the edge of the vessel-type blade and the coated photosensitive material layer was cut off and a uniform cylindrical photosensitive material layer was obtained. Under these conditions, the photosensitive material layer was dried and solidified by hot air of 60° C. while the cylinder was rotating, and then the cylinder was placed in an air drier and dried for 2 hours at 70° C. to completely dry and solidify the photosensitive material layer. After letting the cylinder stand to cool, a thermo-contractible tube (Hishitube HS produced by Mitsubishi Resin Co.), 250 mm. in folded diameter and 12 microns in thickness, was laid over the above-mentioned cylinder for providing a translucent insulating layer. Both ends of the tube were sealed, and the tube was contracted by being placed in hot water of 95° C. for 3 minutes and adhered to the above-mentioned drum-shaped photosensitive material coating uniformly and closely. FIG. 17 shows this state. After cooling, the excessive tube materials on both ends of the cylinder were removed and a drum photosensitive member for electrophotography was completed. This was assembled in electrophotographic image forming equipment, charged positive by 7 kv. corona discharge followed by simultaneous application of optical image irradiation and negative charging, and an electrostatic latent image was formed. This latent image was made visible by power development using the magnetic brush method, and the powder image was pressure transferred onto a good quality paper while grounding the said paper. A good quality copy could be obtained. The powder image remaining on the surface of the drum photosensitive member was wiped off with a soft cloth and the equipment entered a second image forming operation. Since the image forming equipment has devices for charging, optical image irradiation, development, and the wiping-off around the drum photosensitive member, images could be made at any place on the drum photosensitive member continuously without stopping the said drum photosensitive member.

EXAMPLE 3

A photosensitive material for electrophotography was prepared with the same composition as that of Example 2, using photoconductive cadmium sulfide activated by copper. An aluminum cylinder, 145 mm. in diameter and 260 mm. in length, having an axis was prepared as the drum-shaped base. The aluminum cylinder was set on the rotary cutting device of a lathe, was rotated at a speed of 18 r.p.m., and the surface of the cylinder was cut and finished to precision with a tool. The cylinder was left on the lathe and a vessel-type blade having a weir plate was fitted to the tool fitting section as shown in FIG. 12, the knife edge of the said blade was aligned with the generating line and the gap between them was adjusted to 0.3 mm. The weir plate was arranged in the vessel-type blade as shown in FIG. 12 and the above-mentioned prepared photosensitive material was poured into the vessel section formed by the weir plate and the edge of the blade. The photosensitive material was caused to overflow from the edge of the vessel-type blade and was coated on the cylinder surface of the drum-shaped base. Since the cylinder surface was covered with the photosensitive material after about 2 turns, the weir plate 7 was removed as shown in FIG. 13, and the excessive photosensitive material was returned to the vessel section of the vessel-type blade by letting it flow down from the edge. After about 10 turns, the connection between the edge of the vessel-type blade and the photosensitive material coated surface of the drum-shaped base formed by the photosensitive material was broken. Rotation was continued and the photosensitive material coated surface was dried by applying hot air of 60° C. and, after the surface was almost dried, was dried in an air dryer for 2 hours at 70° C., and then was left to stand to cool. A thermocontractible light translucent insulating layer was formed on the surface of the cylinder in the same manner as described in Example 2, and thus a drum photosensitive member for electrophotography was completed. Since in this example, the surface of the cylinder undergoes cutting and processing by a lathe and the photosensitive material was coated without detaching the cylinder from the lathe, a drum photosensitive member having an excellent accuracy from the rotation center and photosensitive material accurate in thickness could be obtained. The drum photosensitive member thus obtained was assembled into the image forming equipment, the surface of which was charged positive by corona discharge of 7 kv. followed by simultaneous optical image irradiation and negative charging. Then powder development was performed to obtain a powder image. A grounded good quality paper was applied to the powder image and the image was transferred by pressing. A good quality copy could be obtained. The powder image remaining on the surface of the drum photosensitive member was wiped off by a soft cloth, and the second image forming operation was begun. By using this drum photosensitive member it was possible to form images at any place on the photosensitive member successively and rapidly.

EXAMPLE 4

In Example 1, instead of gradually reducing the angle between the blade and horizontal plane when removing the excessive photosensitive solution while coating the photosensitive solution, the photosensitive solution was coated in the following way. First, the blade was so arranged that it made an angle of 45° with horizontal plane, that the knife edge and the other end of the blade were contained in the cylinder secant containing the central axis of the cylinder, that the knife edge was positioned lower than the other end and, that the edge was held at 0.07 mm. distance from the surface of the cylinder. The V shaped section formed by the blade and the surface of the surface of the cylinder was filled with photosensitive solution, the cylinder was rotated in the direction from its highest position toward the edge of the blade and the photosensitive solution was coated on the surface of the cylinder uniformly. While the blade was held at a distance of 0.07 mm. from the surface of the cylinder around the center axis of the cylinder, the blade was moved gradually along the surface of the cylinder in such a way that the knife edge and the other end of the blade were almost included in the secant containing the cylinder center. At a position where the edge of the blade was positioned higher than the other end and where the angle made by horizontal plane and the blade was 15°, the blade was stopped to remove the excessive photosensitive liquid. Then the same treatment as described in Example 1 was practiced and a good quality drum photosensitive member was obtained.

EXAMPLE 5

In Example 1, a vessel-type blade was used instead of the flat blade. The vessel-type blade was installed at a position 0.07 mm. separated from the surface of the cylinder on a secant passing through the center of the cylinder making an angle of 30° with the horizontal plane in such a way that the edge of the vessel-type blade was higher in position than the other end. The V shaped section of the vessel-type blade was filled with photosensitive solution for coating. While the cylinder was being rotated in the direction from its highest part toward the edge of the vessel-type blade, the other bottom end of the vessel-type blade was gradually rotated and moved around its edge to make the photosensitive solution in the vessel-type blade overflow from the edge to the surface of the cylinder. After the surface of the cylinder was uniformly covered with the photosensitive liquid, the other end of the bottom of the said blade was gradually rotated downward around the edge of the vessel-type blade to let the excessive photosensitive liquid at the edge flow backward into the vessel to remove it from the surface of the cylinder. Other processes were performed in the similar way to Example 1, and a good quality drum photosensitive member for electrophotography was obtained.

EXAMPLE 6

A drum photosensitive member was produced by cutting and finishing a cylinder base with a lathe and by applying a coat of photosensitive material on it without removing the axis from the lathe in order to improve the accuracy in the dimensions of the drum photosensitive member. An unfinished cylinder, about 162 mm. in diameter and about 303 mm. in length of generating line having an axis was produced using aluminum alloy molding. It was subjected to cutting on a lathe to be made to a cylinder base, 160±0.005 mm. in diameter and 300±0.05 mm. in length of generating line, and, without removing it from the lathe, the flat blade of Example 1 was installed on it in place of the cutting tool and by following the procedure of the same example, a photosensitive solution for electrophotography was coated thereon. After the photosensitive solution was air dried, the cylinder was detached from the lathe and was treated similar to Example 1, and a drum photosensitive member for electrophotography was obtained. An extremely sharp copy could be obtained from the image obtained by using electrophotographic image forming equipment.

EXAMPLE 7

A photosensitive layer formed by coating photoconductive substance according to Example 1 was heated to 150° C. and then left for 1 minute in a floating fine powder of about 150 mesh composed of

| | Parts |
|---|---|
| Epoxyresin Epikote #1007 (product of Shell Petroleum) | 40 |
| Epikote #1001 (product of Shell Petroleum Co.) | 60 |
| Polyvinylbutyrol | 2 |
| Hardner #1040 | 10 | and then was heated in air for 30 minutes at 150° C. while rotating it. A good photosensitive member for electrophotography was obtained.

EXAMPLE 8

A mixture of 100 parts of epoxy resin Epikote #828 (product of Shell Petroleum Co.) and 20 parts of hardner Acmex H-92 (product of Nihon Gosei Kako Co.) was cast instead of aluminum for the base of Example 1 and a drum base was obtained. After finishing it to have a diameter of 159.9 mm., conductive epoxy binding D-723 (product of Fujikura Kasei Co.) was compounded in a ratio of main agent:hardner=1.1 and to it was added methylethylketone to make a paint. The paint was coated on the surface of the above-mentioned cylinder by means of brush painting. The paint was made to run from one end of the conductive surface to the central rotary axis for grounding. After leaving the cylinder for 24 hours in room temperature, it was heated for 2 hours at 100° C., and a plastic cylindrical base having a conductive surface was obtained. A good result was obtained when the painted drum was treated in Example 1.

EXAMPLE 9

A solution composed of

| | Parts (by weight) |
|---|---|
| Poly-3,6-dibrom-N-vinylcarbazol | 100 |
| 1-nitroanthraquinon | 5 |
| Malachite Green | 0.05 |
| Methylene chloride | 800 | was coated uniformly on the surface of aluminum cylinder base, 160 mm. in diameter and 250 mm. in length, by employing the coating method described in Example 1 and, the cylinder was left to stand for about 20 minutes while rotating. It was then dried for 2 hours at 80° C., and the dried film was 15μ in thickness. Then an insulating layer was formed on the photosensitive layer by using a thermo-contractible polyester tube film similar to that of Example 1, and an image was made by employing the same method as Example 1. A good result was obtained.

EXAMPLE 10

To both ends of a cylinder having a conductive glass surface, 200 mm. in diameter and about 5 mm. in thickness, were fitted aluminum cylinder supporting arms. A center shaft was installed parallel to the generating line of the cylinder. This shaft was used as the axis of rotation to make the cylinder rotate smoothly. The conductive part on the surface of the cylinder was connected electrically to the supporting arms by means of a conductive paint to be grounded. The organic photoconductive substance of Example 9 was coated on the surface of the cylinder by the method described in Example 7. After standing for about 20 minutes, the cylinder was heated for 2 hours at 80° C., ethyl alcohol solution (containing 3% of solid matter) of ethylcellulose (Etcell, product of Hercules Co.) was sprayed on the surface to form a surface insulating layer. An optical device was installed in the inside of the cylinder and, by using a light permeable original which was temporarily placed in close contact with the inner surface of the cylinder, an image irradiation was conducted. Such image irradiation from the cylinder was synchronized with positive charging, discharging, development, and visible image transfer, all performed from outside the cylinder. A copied image sufficient for practical use could be obtained.

What is claimed is:

1. A method for producing a drum photosensitive member for electrophotography, comprising the steps of:
   (a) rotating a cylinder about its longitudinal axis while maintaining said axis horizontal; and
   (b) positioning a blade, having a knife edge, an opposite edge and a blade face therebetween, adjacent the surface of said cylinder and, while maintaining said knife edge horizontal and spaced by a predetermined distance from said surface of said rotating cylinder:
      (1) disposing said blade with said opposite edge upwardly of said knife edge, and coating said cylinder surface by applying a solution of photosensitive material to said blade face in an amount sufficient to provide photosensitive material solution extending from said blade face to the cylinder surface juxtaposed therewith throughout the coating of the remainder of said cylinder surface to a thickness less than said predetermined distance, and upon such coating of said cylinder surface;
      (2) redisposing said blade with said opposite edge downwardly of said knife edge, thereby directing away from said cylinder surface photosensitive material solution extending from said blade face to said juxtaposed cylinder surface and providing a uniform coating of said predetermined thickness on the entirety of said cylinder surface.

2. The method claimed in claim 1 wherein said blade redisposing step is practiced by pivoting said blade about said knife edge.

3. The method claimed in claim 1 wherein said cylinder includes electrically insulating material defining said cylinder surface.

4. The method claimed in claim 1 wherein said cylinder includes electrically conductive material defining said cylinder surface.

5. The method claimed in claim 1 wherein said cylinder is a thin-walled cylinder and wherein said cylinder surface comprises the surface of the interior wall thereof.

6. The method claimed in claim 5 wherein said blade redisposing step is practiced by pivoting said blade about said knife edge.

7. The method claimed in claim 5 wherein said cylinder includes electrically insulating material defining said cylinder surface.

8. The method claimed in claim 5 wherein said cylinder includes electrically conductive material defining said cylinder surface.

9. The method claimed in claim 1 wherein first and second disc members of like radius, exceeding the radius of said cylinder by said predetermined distance, are disposed adjacent respective ends of said cylinder coaxially with said cylinder.

10. The method claimed in claim 1 including the further terminal step of forming an electrically insulating layer on said drum photosensitive member.

11. The method claimed in claim 10 wherein said terminal step is practiced by applying a solution of electrically insulating material to said blade face and accordingly onto the entirety of the drum photosensitive member surface, while maintaining said knife edge horizontal and spaced by a predetermined distance from said drum photosensitive member surface.

12. A method for producing a drum photosensitive member for electrophotography, comprising the steps of:
  (a) rotating a cylinder about its longitudinal axis while maintaining said axis horizontal; and
  (b) placing first and second blades, each having a knife edge, an opposite edge and a blade face therebetween, adjacent the surface of said cylinder respectively in first and second vertically displaced positions and, while maintaining the knife edges of each of said blades horizontal and spaced by a predetermined distance from said surface of said rotating cylinder:
    (1) disposing said first blade with said opposite edge thereof upwardly of said knife edge thereof and coating said cylinder surface by applying a solution of photosensitive material to said blade face of said first blade in an amount in excess of that required to provide a coating on said cylinder surface of thickness less than said predetermined distance, and
    (2) disposing said second blade with said opposite edge thereof downwardly of said knife edge thereof, thereby collecting from said cylinder surface said excess amount of said photosensitive material solution.

13. The method claimed in claim 12 wherein said cylinder is a thin-walled cylinder and wherein said cylinder surface comprises the surface of the interior wall thereof.

References Cited

UNITED STATES PATENTS

| 3,357,402 | 12/1967 | Bhagat | 117—17.5 |
| 1,182,982 | 5/1916 | Crump | 118—409 |
| 2,135,208 | 11/1938 | Bray et al. | 117—94 |
| 2,855,895 | 10/1958 | Burns et al. | 118—259 X |
| 3,416,943 | 12/1968 | Clark et al. | 118—409 X |

WILLIAM D. MARTIN, Primary Examiner

W. R. TRENOR, Assistant Examiner

U.S. Cl. X.R.

117—94, 111 F; 118—409, 413

UNITED STATES PATENT OFFICE
CERTIFICATE OF CORRECTION

Patent No. 3,697,302      Dated October 10, 1972

Inventor(s) Takashi Ihara et al.

It is certified that error appears in the above-identified patent and that said Letters Patent are hereby corrected as shown below:

Column 4, line 23, "th gap" should read --the gap--.
Column 4, line 65, after "poured" insert --externally--.
Column 5, line 17, delete "to have" and insert --with--.
Column 5, line 37, "is the one" should read --is one--.
Column 6, line 10, after "determined" insert --as--.
Column 6, line 12, delete "as".
Column 8, line 5, after "formed" insert --into--.
Column 8, line 37, after "distance" insert -- $\ell$ --.
Column 8, line 38, after "gap" insert -- $\ell$ --.
Column 8, line 42, after "not" insert --always--.
Column 8, line 56, after "gap" insert -- $\ell$ --.
Column 10, line 40, "alkyl" should read --alkyd--.
Column 11, line 17, "Sakai Kagak Co." should read --Sakai Kagaku Co.--.
Column 11, line 61, "poto-" should read --photo---.
Column 11, line 74, after "off" insert --with--.
Column 12, line 56, after "section" insert --of--.
Column 13, line 20, delete "the" (first instance).
Column 14, line 75, "be made to" should read --make--.
Column 15, lines 21-22, "(product of Shell Petroleum" should read --(product of Shell Petroleum Co.)--.
Column 15, line 49, after "treated" insert --as--.
Column 16, line 13, after "from" insert --inside--.

Signed and sealed this 29th day of May 1973.

(SEAL)
Attest:

EDWARD M. FLETCHER, JR.
Attesting Officer

ROBERT GOTTSCHALK
Commissioner of Patents